United States Patent
Akuzawa et al.

(10) Patent No.: US 10,033,227 B2
(45) Date of Patent: Jul. 24, 2018

(54) RESONANT TYPE TRANSMISSION POWER SUPPLY DEVICE AND RESONANT TYPE TRANSMISSION POWER SUPPLY SYSTEM

(71) Applicant: Mitsubishi Electric Engineering Company, Limited, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 156 days.

(21) Appl. No.: 15/104,157

(22) PCT Filed: Dec. 26, 2013

(86) PCT No.: PCT/JP2013/084836
§ 371 (c)(1),
(2) Date: Jun. 13, 2016

(87) PCT Pub. No.: WO2015/097807
PCT Pub. Date: Jul. 2, 2015

(65) Prior Publication Data
US 2016/0322868 A1 Nov. 3, 2016

(51) Int. Cl.
*H02J 50/12* (2016.01)
*H02J 50/90* (2016.01)
(Continued)

(52) U.S. Cl.
CPC .............. *H02J 50/12* (2016.02); *H02J 7/025* (2013.01); *H02J 7/04* (2013.01); *H02J 17/00* (2013.01);
(Continued)

(58) Field of Classification Search
None
See application file for complete search history.

(56) References Cited

U.S. PATENT DOCUMENTS

2008/0200119 A1 8/2008 Onishi et al.
2009/0224723 A1 9/2009 Tanabe
(Continued)

FOREIGN PATENT DOCUMENTS

JP 2006-230032 A 8/2006
JP 2008-206231 A 9/2008
(Continued)

OTHER PUBLICATIONS

Office Action dated Feb. 28, 2017 in Japanese Patent Application No. 2015-554397 (with unedited computer generated English translation).

(Continued)

*Primary Examiner* — Jared Fureman
*Assistant Examiner* — Aqeel Bukhari
(74) *Attorney, Agent, or Firm* — Oblon, McClelland, Maier & Neustadt, L.L.P.

(57) ABSTRACT

Disclosed is a resonant type transmission power supply device including a transmission power state detecting circuit 11 to detect a transmission power state of a transmission antenna 2, a foreign object detecting circuit 124 to detect the presence or absence of a foreign object in an electromagnetic field generated from the transmission antenna 2 on the basis of a detection result acquired by the transmission power state detecting circuit 11, and a power control circuit 125 to reduce or stop the supply of electric power to the transmission antenna 2 when foreign object is detected by the foreign object detecting circuit 124.

6 Claims, 6 Drawing Sheets

(51) Int. Cl.
*H02J 7/02* (2016.01)
*H02J 7/04* (2006.01)
*H02J 50/40* (2016.01)
*H02J 50/05* (2016.01)
*H02J 17/00* (2006.01)
*H02J 50/60* (2016.01)

(52) U.S. Cl.
CPC .............. *H02J 50/05* (2016.02); *H02J 50/40* (2016.02); *H02J 50/60* (2016.02); *H02J 50/90* (2016.02)

(56) References Cited

U.S. PATENT DOCUMENTS

| | | | |
|---|---|---|---|
| 2012/0001493 A1 | 1/2012 | Kudo et al. | |
| 2012/0038317 A1 | 2/2012 | Miyamoto et al. | |
| 2012/0146580 A1* | 6/2012 | Kitamura | H01F 38/14 320/108 |
| 2012/0212070 A1 | 8/2012 | Tanabe | |
| 2012/0228952 A1* | 9/2012 | Hall | H03H 7/40 307/104 |
| 2013/0328411 A1 | 12/2013 | Tanabe | |
| 2014/0253029 A1 | 9/2014 | Uchida et al. | |
| 2015/0194814 A1 | 7/2015 | Taylor et al. | |

FOREIGN PATENT DOCUMENTS

| | | |
|---|---|---|
| JP | 2008-236917 A | 10/2008 |
| JP | 2008-237006 A | 10/2008 |
| JP | 2008-237007 A | 10/2008 |
| JP | 2009-33782 A | 2/2009 |
| JP | 2009-219177 A | 9/2009 |
| JP | 2012-16171 A | 1/2012 |
| JP | 2012-44735 A | 3/2012 |
| JP | 2012-175824 A | 9/2012 |
| JP | 2013-126307 A | 6/2013 |
| JP | 2013-212034 A | 10/2013 |
| JP | 2013-215073 A | 10/2013 |
| WO | WO 2013/080285 A1 | 6/2013 |
| WO | WO 2013/176751 A1 | 11/2013 |

OTHER PUBLICATIONS

International Search Report dated Feb. 4, 2014 in PCT/JP13/084836 Filed Dec. 26, 2013.

* cited by examiner

US 10,033,227 B2

RESONANT TYPE TRANSMISSION POWER SUPPLY DEVICE AND RESONANT TYPE TRANSMISSION POWER SUPPLY SYSTEM

FIELD OF THE INVENTION

The present invention relates to a resonant type transmission power supply device and a resonant type transmission power supply system that detect the presence or absence of a foreign object in an electromagnetic field generated from a transmission antenna, and, when detecting a foreign object, reduce or stop power transmission.

BACKGROUND OF THE INVENTION

A conventional power supply device having a function of detecting the presence or absence of a foreign object, as shown in FIG. 6 is known (for example, refer to patent reference 1). In the power supply device disclosed by this patent reference 1, a plurality of sensor coils 102 in each of which its winding axis is orthogonal to a transmission antenna 101 are disposed (only one sensor coil is shown in FIG. 6) so as to detect a foreign object existing in surroundings 103 of the sensor coils 102. A reception antenna (not shown) is configured in the same way.

RELATED ART DOCUMENT

Patent Reference

Patent reference 1: Japanese Unexamined Patent Application Publication No. 2013-215073

SUMMARY OF THE INVENTION

Problems to be Solved by the Invention

However, because the sensor coils 102 for foreign object detection are disposed separately from the transmission antenna 101 and the reception antenna in the conventional configuration, the following problems arise. A first problem is that the size of the entire device increases by the size of the sensor coils 102. More specifically, because the sensor coils 102 are arranged on the transmission antenna 101 and the reception antenna, the height (thickness) of the device increases especially and its mass also increases. Another problem is that it is difficult to detect a foreign object existing at a long distance away from the transmission antenna 101 and the reception antenna or in the vicinity of the center between the transmission antenna 101 and the reception antenna even if the foreign object exists within the range of the electromagnetic field generated from the transmission antenna 101 further problem is that because a large number of sensor coils 102 are needed for foreign matter detection, this results in a cause of increase in the cost. A still further problem is that because it necessary to drive a large number of sensor coils 102 for foreign matter detection, this results in a cause of increase in the power consumption.

The present invention is made in order to solve the above-mentioned problems, and it is therefore an object of the present invention to provide a resonant type transmission power supply device and a resonant type transmission power supply system capable of detecting the presence or absence of a foreign object in an electromagnetic field generated from a transmission antenna, and performing reduction or stop of power transmission when a foreign object is detected.

Means for Solving the Problem

According to the present invention, there is provided a resonant type transmission power supply device including: a transmission power state detecting circuit to detect a transmission power state of a transmission antenna; a foreign object detecting circuit to detect the presence or absence of a foreign object in an electromagnetic field generated from the transmission antenna on the basis of a detection result acquired by the transmission power state detecting circuit; and a power control circuit to reduce or stop the supply of electric power to the transmission antenna when a foreign object is detected by the foreign object detecting circuit.

Advantages of the Invention

Because the resonant type transmission power supply device according to the present invention is configured as above, the presence or absence of a foreign object in the electromagnetic field generated from the transmission antenna can be detected, and, when a foreign object is detected, the power transmission can be reduced or stopped.

BRIEF DESCRIPTION OF THE FIGURES

FIG. 2(a) is a diagram showing a case in which no foreign object exists, and FIG. 2(b) is a diagram showing a case in which a dielectric foreign object exists;

FIG. 3(a) is a diagram showing a case in which no foreign object exists, and FIG. 3(b) is a diagram showing a case in which a magnetic foreign object exists;

EMBODIMENTS OF THE INVENTION

Hereafter, the preferred embodiments of the present invention will be explained in detail with reference to the drawings.

Embodiment 1

Figure 1:
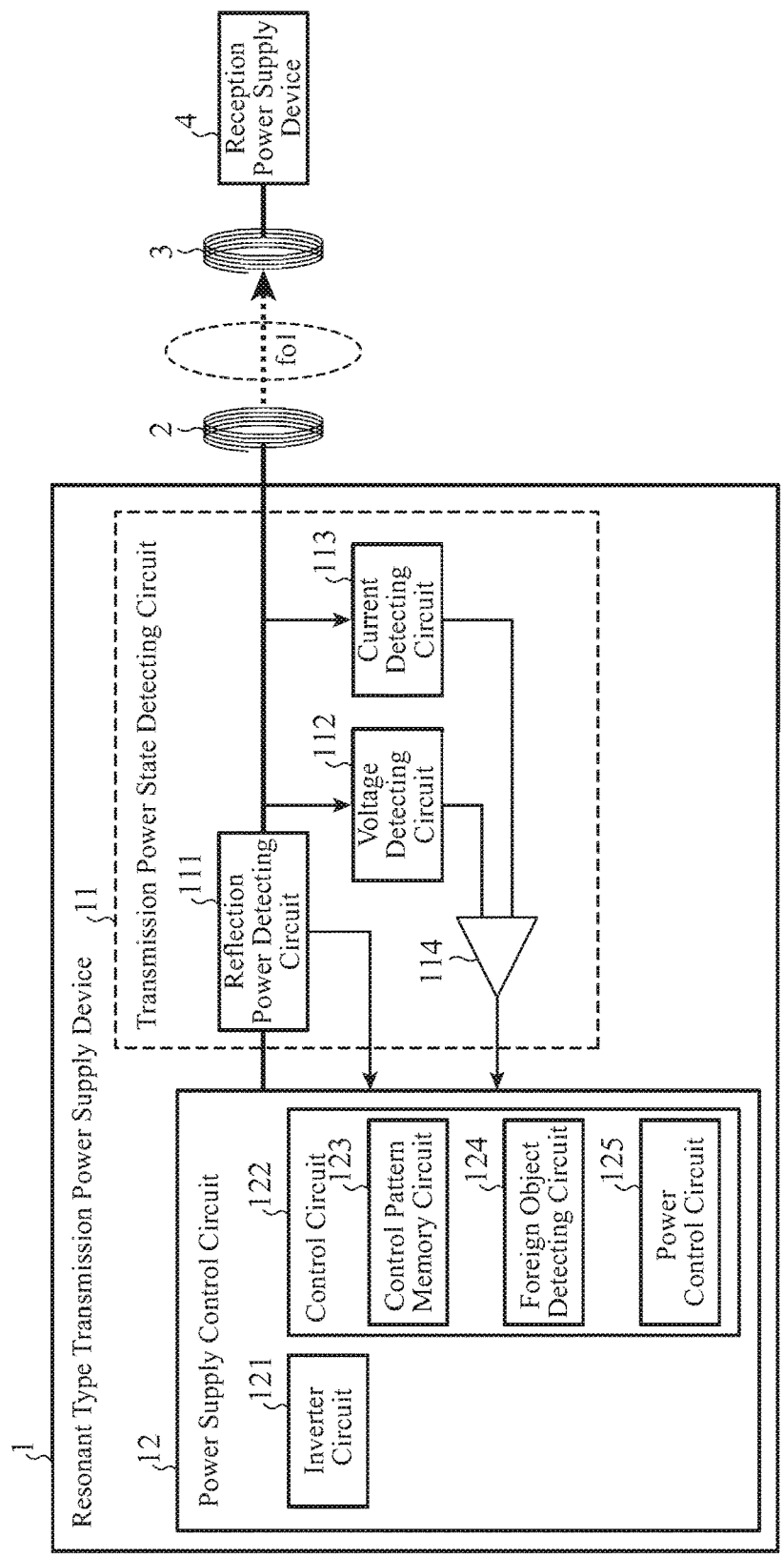
FIG. 1 is a diagram showing the configuration of a resonant type power transmission system provided with a resonant type transmission power supply device according to Embodiment 1 of the present invention.

FIG. 1 is a diagram showing the configuration of a resonant type power transmission system provided with a resonant type transmission power supply device according to Embodiment 1 of the present invention.

The resonant type power transmission system transmits electric power including an electric signal. This resonant type power transmission system is configured with the resonant type transmission power supply device 1, a transmission antenna 2, a reception antenna 3, and a reception power supply device as shown in FIG. 1.

The resonant type transmission power supply device 1 is arranged as a stage preceding the transmission antenna 2, and controls the supply of the electric power to the transmission antenna 2. Further, the resonant type transmission power supply device 1 has a function of detecting the presence or absence of a foreign object in an electromagnetic field shown by a broken line in FIG. 1 and generated from the transmission antenna 2 (space including power transmission space between the transmission and reception antennas 2 and 3 and its neighborhood), and a function of, when a foreign object is detected, reducing or stopping the supply of the electric power to the transmission antenna 2. The foreign object includes a dielectric foreign object (a person's hand, an animal or the like) and a magnetic foreign object (metal or the like). The details of this resonant type transmission power supply device 1 will be described below.

The transmission antenna 2 transmits the electric power from the resonant type transmission power supply device 1 to the reception antenna 3 (the transmission is not limited to non-contact one).

The reception antenna 3 receives the electric power from the transmission antenna 2 (the reception is not limited to non-contact one). The electric power received by this reception antenna 13 is supplied to load equipment or the like (not shown) via the reception power supply device 4.

The reception power supply device 4 is arranged between the reception antenna 3 and the load equipment or the like, and rectifies the electric power (AC output) received by the reception antenna 3. This reception power supply device 4 is a power supply circuit of AC input-DC output type or AC input-AC output type.

A transmission method which the resonant type power transmission system uses in the case of wireless power transmission is not limited particularly, and can be any one of a method according to magnetic-field resonance, a method according to electric-field resonance, and a method according to electromagnetic induction.

Next, the configuration of the resonant type transmission power supply device 1 will be explained.

The resonant type transmission power supply device 1 is configured with a transmission power state detecting circuit 11 and a power supply control circuit 12.

The transmission power state detecting circuit 11 detects the transmission power state of the transmission antenna 2. This transmission power state detecting circuit 11 is configured with a reflection power detecting circuit 111, a voltage detecting circuit 112, a current detecting circuit 113 and a phase/amplitude detecting circuit 114.

The reflection power detecting circuit 111 detects the electric power (reflection power) that returns to the transmission antenna without being able to be power-transmitted from the transmission antenna.

The voltage detecting circuit 112 detects the voltage inputted to the transmission antenna 2.

The current detecting circuit 113 detects the current inputted to the transmission antenna 2.

The phase/amplitude detecting circuit 114 detects the phase difference between the voltage detected by the voltage detecting circuit 112 and the current detected by the current detecting circuit 113, and the amplitudes of the voltage and the current.

The power supply control circuit 12 detects the presence or absence of a foreign object in the electromagnetic field generated from the transmission antenna 2 on the basis of the detection result acquired by the transmission power state detecting circuit 11, and, when detecting a foreign object, reduces or stops the sup of the electric power to the transmission antenna 2. This power supply control circuit 12 is configured with an inverter circuit 121 that performs output of a high frequency alternating current, and a control circuit 122 that controls the output. The inverter circuit 121 is an inverter power supply circuit of AC input-AC output type or DC input-AC output type. The control circuit 122 is configured with a control pattern memory circuit 123, a foreign object detecting circuit 124 and a power control circuit 125.

The control pattern memory circuit 123 is a memory that stores information about the foreign object detection and the power control. The information stored in this control pattern memory circuit 123 includes information showing a threshold for the transmission power state (the reflection power, the phase difference between the voltage and the current, and the amplitudes of the voltage and the current), which is used when the foreign object detecting circuit 124 performs the foreign object detection, information showing the types of foreign objects (dielectric objects and magnetic objects) detectable using the transmission power state, and information showing the descriptions of the control by the power control circuit 125 according to the types of foreign objects (stop of the electric power supply in the case of a dielectric foreign object, reduction of the electric power supply in the case of a magnetic foreign object, etc.)

The foreign object detecting circuit 124 detects the presence or absence of a foreign object in the electromagnetic field generated from the transmission antenna 2 according to the information stored in the control pattern memory circuit 123 and on the basis of the detection result acquired by the transmission power state detecting circuit 11.

When a foreign object is detected by the foreign object detecting circuit 124, the power control circuit 125 reduces or stops the supply of the electric power to the transmission antenna 2 according to the information stored in the control pattern memory circuit 123.

Next, the operation of the resonant type transmission power supply device configured as above will be explained by referring to FIGS. 2 and 3.

In the resonant type power transmission system, AC or DC power is supplied to the power supply control circuit 12 of the resonant type transmission power supply device 1, and the inverter circuit 121 of the power supply control circuit 12 supplies an AC output having a high frequency to the transmission antenna 2. The electric power supplied to the transmission antenna 2 resonates at the AC frequency and is transmitted from the transmission antenna 2 to the reception antenna 3. AC output of the electric power received by the reception antenna 3 to the reception power supply device 4 is performed. The reception power supply device 4 then rectifies the electric power and performs DC or AC output of the electric power.

On the other hand, in the resonant type transmission power supply device 1, the transmission power state detecting circuit 11 detects the transmission power state of the transmission antenna 2 and transmits a signal showing the state to the power supply control circuit 12. The control circuit 122 of the power supply control circuit 12 then detects the presence or absence of a foreign object in the electromagnetic field generated from the transmission antenna 2 on the basis of the signal, thereby controlling the AC output to the transmission antenna 2.

Figure 2:
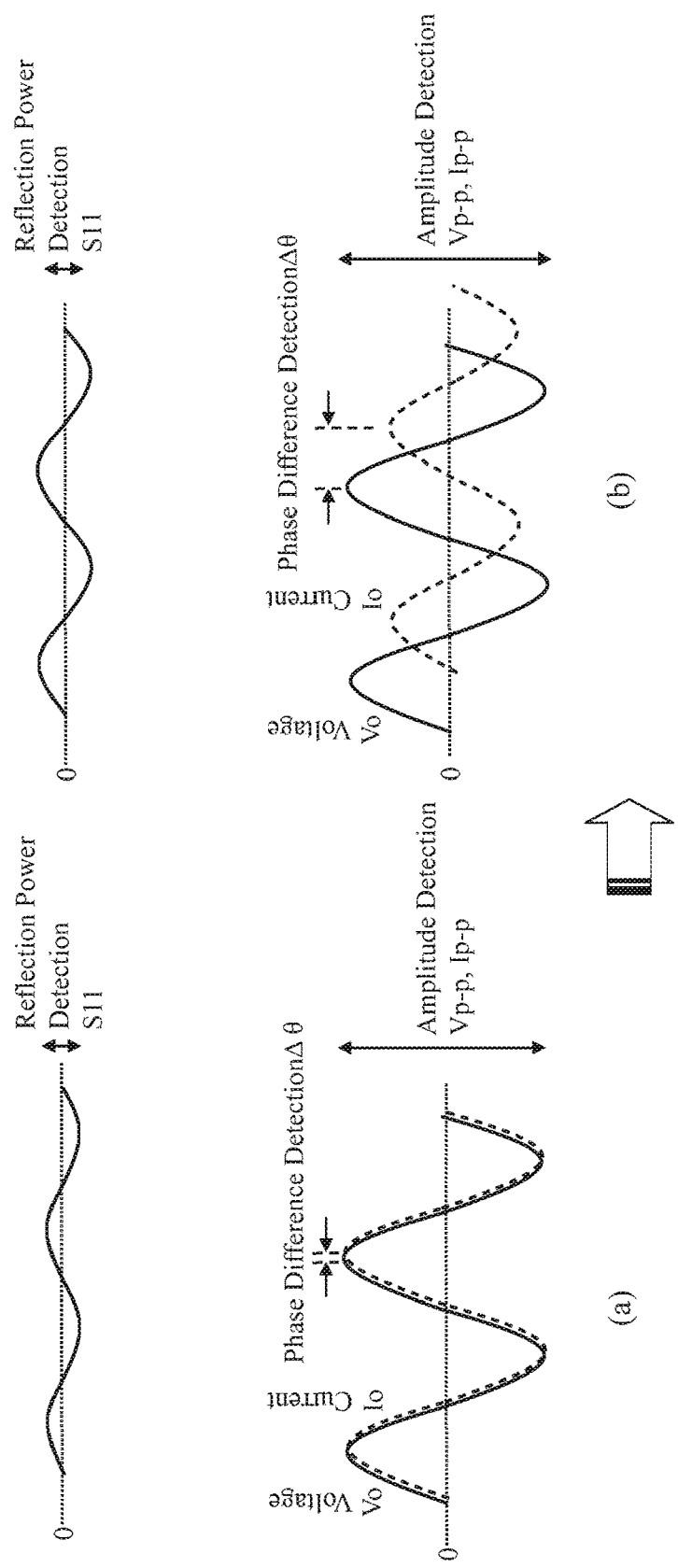
FIG. 2 is a diagram showing reflection power, a phase difference between a voltage and a current, and the amplitudes of the voltage and the current which are detected by the resonant type transmission power supply device according to Embodiment 1 of the present invention.

When no foreign object exists in the electromagnetic field generated from the transmission antenna 2, the reflection power from the transmission antenna 2, the phase difference between the voltage and the current which are inputted to the transmission antenna 2, and the amplitudes of the voltage and the current are as shown in FIGS. 2(*a*) and 3(*a*).

In contrast, when a dielectric foreign object (a person's hand, an animal or the like) exists in the electromagnetic field generated from the transmission antenna 2, the reflection power, the phase difference and the amplitudes have waveforms as shown in FIG. 2(*b*). More specifically, because the power transmission is blocked by the foreign object, the reflection power increases as compared with the case in which no foreign object exists, as shown in an upper portion of FIG. 2. Further, as shown in a lower portion of FIG. 2, the phase difference between the voltage and the current increases and the amplitudes of the voltage and the current are changed. When detecting a dielectric foreign object, the power supply control circuit 12 then stops the supply of the electric power to the transmission antenna 2, for example.

Figure 3:
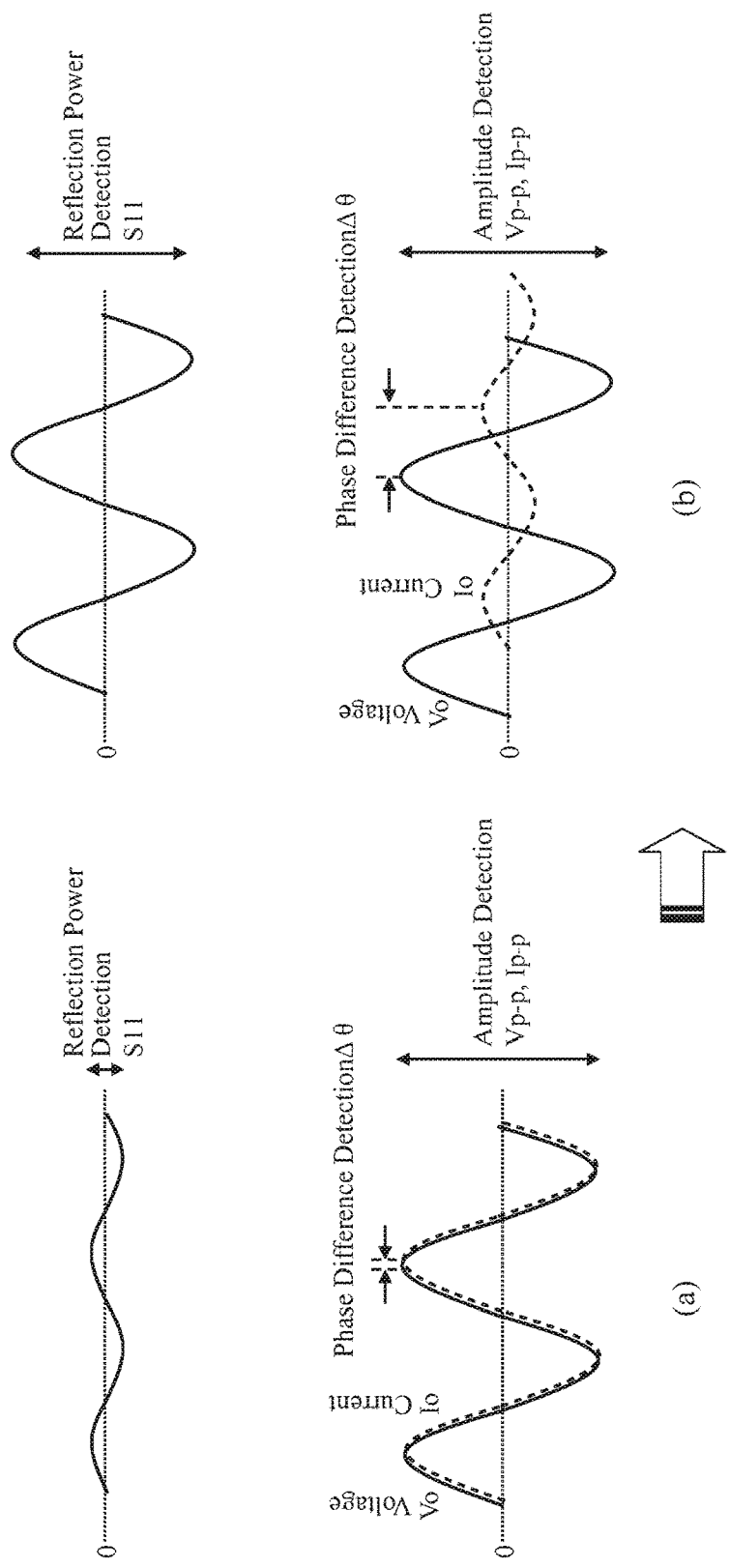
FIG. 3 is a diagram showing the reflection power, the phase difference between the voltage and the current, and the amplitudes of the voltage and the current which are detected by the resonant type transmission power supply device according to Embodiment 1 of the present invention.

Further, when a magnetic foreign object (metal or the like) exists in the electromagnetic field generated from the transmission antenna 2, the reflection power, the phase difference and the amplitudes have waveforms as shown in FIG. 3(*b*). More specifically, because the power transmission is blocked by the foreign object, the reflection power increases as compared with the case in which no foreign object exists, as shown in an upper portion of FIG. 3. Further, as shown in a lower portion of FIG. 3, the phase difference between the voltage and the current is changed, the amplitude of the voltage increases, and the amplitude of the current decreases. When detecting a magnetic foreign object, the power supply control circuit 12 then reduces the supply of the electric power to the transmission antenna 2, for example.

As mentioned above, because the resonant type transmission power supply device according to this Embodiment 1 is configured in such a way as to monitor a change of the transmission power state of the transmission antenna 2, the resonant type transmission power supply device can detect the presence or absence of a foreign object in the electromagnetic field generated from the transmission antenna 2, and, when detecting a foreign object, can reduce or stop the supply of the electric power to the transmission antenna 2.

Further, because sensor coils 102 or the likes for foreign object detection, like those disposed in a conventional configuration, are not needed for the foreign object detection, the transmission and reception antennas 2 and 3 can be configured in a small size and in a lightweight. Further, a foreign object existing, in the electromagnetic field generated from the transmission antenna 2, at a long distance away from the transmission antenna 2 or in the vicinity of the center of the transmission and reception antennas 2 and 3 can be also detected. Further, because additional devices, such as sensor coils 102, are not needed, a cost reduction can be achieved. Further, because it is not necessary to drive additional devices such as sensor coils 102, low power consumption can be achieved.

Although the case in which the transmission power state detecting circuit 11 shown in FIG. 1 detects, as the transmission power state, all of the reflection power, the phase difference between the voltage and the current, and the amplitudes of the voltage and the current shown, this embodiment is not limited to this example. Although the accuracy of detection of a foreign object degrades, some of the detection items can be eliminated.

Further, commonality of the transmission power state detecting circuit 11 shown in FIG. 1 can be achieved as a detecting circuit at the time of adjusting the resonant coupling impedance of the transmission and reception antennas 2 and 3 according to a change of the input impedance of the reception antenna 3, and a cost reduction can be achieved. In this case, a resonance impedance adjusting circuit that adjusts the resonance impedance of the transmission antenna 2 (matches the resonance condition of the transmission antenna 2 to that of the reception antenna 3) on the basis of the detection result acquired by the transmission power state detecting circuit 11 is disposed separately.

Embodiment 2

Figure 4:
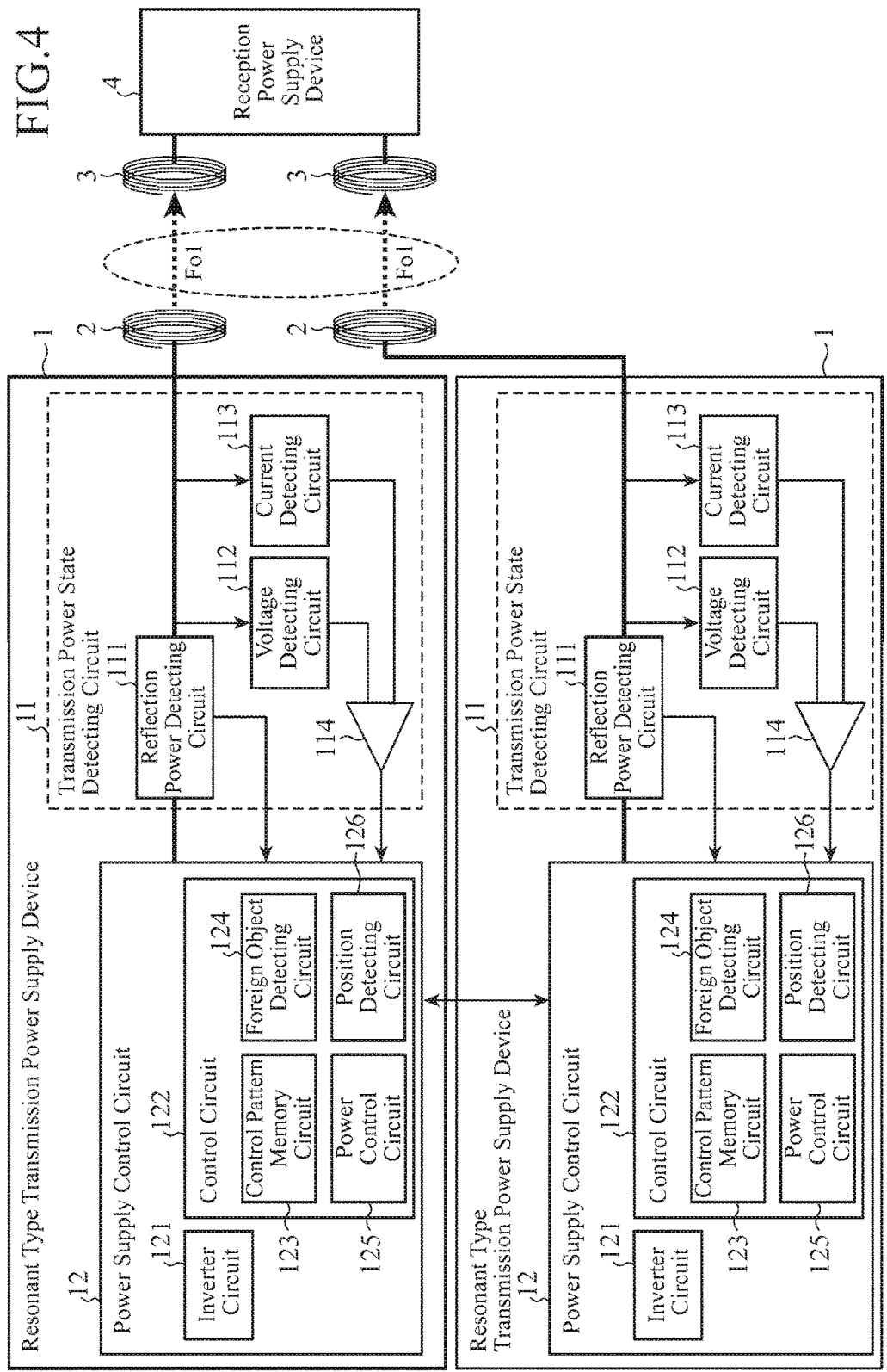
FIG. 4 is a diagram showing the configuration of a resonant type power transmission system provided with a resonant type transmission power supply system according to Embodiment 2 of the present invention.

In Embodiment 2, a case which a plurality of transmission and reception systems (each having a resonant type transmission power supply device 1, a transmission antenna 2 and a reception antenna 3) are disposed, and perform power transmission at opposite phases and at the same fixed frequency, respectively will be shown. In this case, the plurality of resonant type transmission power supply devices 1 construct a resonant type transmission power supply system according to the present invention. FIG. 4 is a diagram showing the configuration of a resonant type power transmission system provided with the resonant type transmission power supply system according to Embodiment 2 of the present invention. In the resonant type power transmission system according to Embodiment 2 shown FIG. 4, two transmission and reception systems of the resonant type power transmission system according to Embodiment 1 shown in FIG. 1 are disposed, and a position detecting circuit 126 is added to a power supply control circuit 12 of each of the resonant type transmission power supply devices 1. Further, the power supply control circuits 12 of the systems are connected to each other via a connecting line, and a detection result acquired by each of transmission power state detecting circuits 11 can be shared between them. The other components are the same as those according to Embodiment 1 and are designated by the same reference character strings, and an explanation will be made as to only a different portion.

Each position detecting circuits 126 detects the position of a foreign object on the basis of a detection result (a waveform difference) acquired by the transmission power state detecting circuit 11 of each of the systems when the foreign object is detected by a corresponding foreign object detecting circuit 124.

Further, a corresponding power control circuit 125 reduces or stops the supply of the electric power to the corresponding transmission antenna 2 on the basis of the position of the foreign object detected by the position detecting circuit 126.

As a result, in which one of the transmission and reception systems the foreign object is located is determined. Further, whether the foreign object is located in the immediate vicinity of the transmission and reception antennas 2 and 3 or in the vicinity of the center between the transmission antenna 2 and the reception antenna 3 determined. Then, it can be determined that the foreign object is garbage when the foreign object is located in the immediate vicinity of the transmission and reception antennas 2 and 3, or the foreign object is a person's hand, an animal or the like when the foreign object is located in the vicinity of the center. Further, whether or not the foreign object is a moving object can be determined. Therefore, the accuracy of detection of foreign objects is improved.

Embodiment 3

Figure 5:
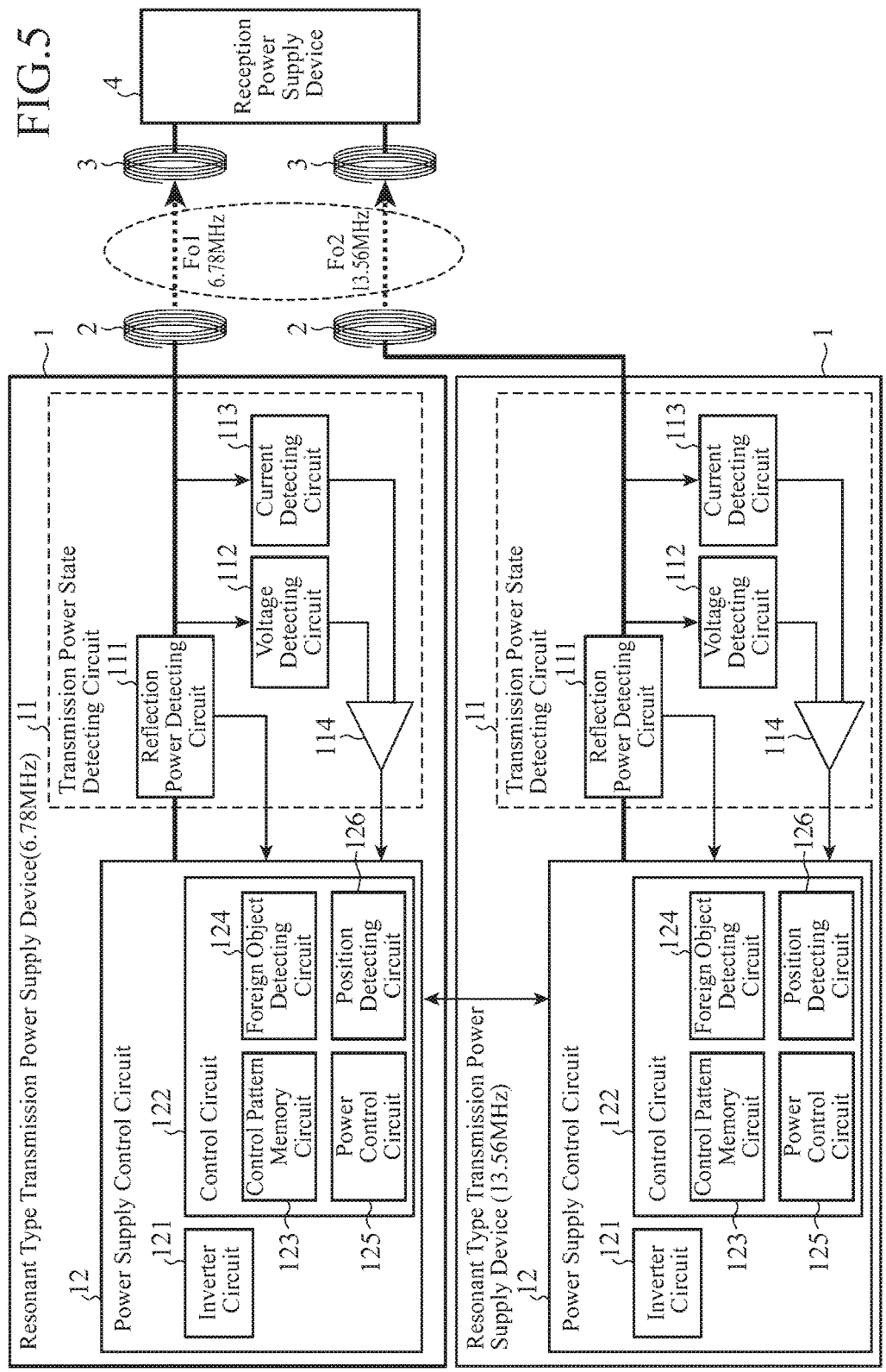
FIG. 5 is a diagram showing the configuration of a resonant type power transmission system, provided with a resonant type transmission power supply system according to Embodiment 3 of the present invention.
Figure 6:
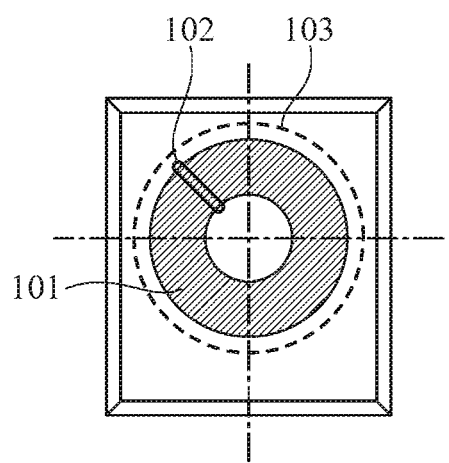
FIG. 6 is a diagram showing the configuration of a conventional power supply device.

In Embodiment 3, a case in which a plurality of transmission and reception systems are disposed and perform power transmission at different fixed frequencies will be shown. FIG. 5 is a diagram showing the configuration of a resonant type power transmission system provided with a resonant type transmission power supply system according to Embodiment 3 of the present invention. The resonant type power transmission system according to Embodiment 3 shown in FIG. 5 has the same basic configuration as the resonant type power transmission system according to Embodiment 2 shown. FIG. 4 and the same components as those according to Embodiment 2 are designated by the same reference numerals and an explanation will be made as to only a different portion.

Although n the example shown in FIG. 5, a case in which a resonant type transmission power supply device shown in an upper portion of the figure performs power transmission by using a 6.78 MHz band as its transmission frequency and a resonant type transmission power supply device 1 shown in a lower portion of the figure performs power transmission by using a 13.56 MHz band as its transmission frequency is shown, this embodiment is limited to this example. The above-mentioned frequency bands are used for commercial power supplies.

Further, each power control circuit 125 determines the type of a foreign object on the basis of both the fixed frequency of a transmission antenna 2 of each of the systems, and a detection result (a waveform difference) acquired by a transmission power state detecting circuit 11 of each of the systems when the foreign object is detected by a corresponding foreign object detecting circuit 124, and reduces or stops the supply of the electric power to the corresponding transmission antenna 2.

The reflectivity to electric power transmitted at a specific transmission frequency differs according to foreign object types (dielectric objects and magnetic objects). Therefore, by using this characteristic, whether the foreign object is a dielectric object or a magnetic object can be determined more correctly, and the accuracy of detection is improved.

While the invention has been described in its preferred embodiments, to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

The resonant type transmission power supply device according to the present invention can detect the presence or absence of a foreign object in an electromagnetic field generated from a transmission antenna, and, when detecting a foreign object, can perform reduction or stop of the power transmission, and the resonant type transmission power supply device is suitable for use as a resonant type transmission power supply device or the like that controls the supply of electric power to a transmission antenna.

EXPLANATIONS OF REFERENCE NUMERALS 1 resonant type transmission power supply device, 2 transmission antenna, 3 reception antenna, 4 reception power supply device, 11 transmission power state detecting circuit, 12 power supply control circuit, 111 reflection power detecting circuit, 112 voltage detecting circuit, 113 current detecting circuit, 114 phase/amplitude detecting circuit, 121 inverter circuit, 122 control circuit, 123 control pattern memory circuit, 124 foreign object detecting circuit, 125 power control circuit, and 126 position detecting circuit.

The invention claimed is:

1. A resonant type transmission power supply device comprising:
a transmission power state detecting circuit to detect a transmission power state of a transmission antenna;
a foreign object detecting circuit to detect presence or absence of a foreign object in an electromagnetic field generated from said transmission antenna on a basis of a detection result acquired by said transmission power state detecting circuit; and
a power control circuit to reduce supply of electric power to said transmission antenna when a foreign object is detected to be a magnetic object and stop supply of electric power to said transmission antenna when a foreign object is detected to be a dielectric object.

2. The resonant type transmission power supply device according to claim 1, wherein said transmission power state detecting circuit detects, as the transmission power state, at least one of reflection power from said transmission antenna, a phase difference between a voltage and a current which are inputted to said transmission antenna, and amplitudes of said voltage and said current.

3. The resonant type transmission power supply device according to claim 1, wherein said transmission antenna performs wireless power transmission according to magnetic-field resonance with a reception antenna, and said resonant type transmission power supply device includes a resonance impedance adjusting circuit that matches a resonance condition of said transmission antenna to that of said reception antenna on a basis of the detection result acquired by said transmission power state detecting circuit.

4. The resonant type transmission power supply device according to claim 1, wherein said transmission antenna performs wireless power transmission according to electric-field resonance with a reception antenna, and said resonant type transmission power supply device includes a resonance impedance adjusting circuit that matches a resonance condition of said transmission antenna to that of said reception antenna on a basis of the detection result acquired by said transmission power state detecting circuit.

5. The resonant type transmission power supply device according to claim 1, wherein said transmission antenna performs wireless power transmission according to electromagnetic induction with a reception antenna, and said resonant type transmission power supply device includes a resonance impedance adjusting circuit that matches a resonance condition of said transmission antenna to that of said reception antenna on a basis of the detection result acquired by said transmission power state detecting circuit.

6. A resonant type transmission power supply system provided with a plurality of resonant type transmission power supply devices each of that controls supply of electric power to a corresponding one of transmission antennas, in which said transmission antennas operate at different fixed frequencies, respectively, each of said resonant type transmission power supply devices comprising:

- a transmission power state detecting circuit to detect a transmission power state of said corresponding transmission antenna;
- a foreign object detecting circuit to detect presence or absence of a foreign object in an electromagnetic field generated from said corresponding transmission antenna on a basis of a detection result acquired by said transmission power state detecting circuit; and
- a power control circuit to, when a foreign object is detected by said foreign object detecting circuit, determine a type of the foreign object on a basis of both the fixed frequency of each of said plurality of transmission antennas and a detection result acquired by each of said transmission power state detecting circuits,
- wherein the power control circuit reduces supply of electric power to said corresponding transmission antenna when the foreign object is detected to be a magnetic body, and stops supply of electric power to said corresponding transmission antenna when the foreign object is detected to be a dielectric body.

* * * * *